(12) United States Patent  (10) Patent No.: US 7,142,090 B2
Ueda et al.  (45) Date of Patent: Nov. 28, 2006

(54) VEHICULAR REMOTE CONTROL SYSTEM

(75) Inventors: Shinichi Ueda, Saitama (JP); Suguru Asakura, Saitama (JP); Shinichi Arie, Saitama (JP); Akira Kamikura, Saitama (JP); Kenichi Sawada, Saitama (JP); Kentaro Yoshimura, Saitama (JP); Kazuhiko Sueoka, Gifu (JP); Naoki Hayashi, Gifu (JP)

(73) Assignees: Honda Motor Co., Ltd., Tokyo (JP); Matsushita Electric Industrial Co., Ltd., Osaka (JP)

( * ) Notice: Subject to any disclaimer, the term of this patent is extended or adjusted under 35 U.S.C. 154(b) by 450 days.

(21) Appl. No.: 10/677,738

(22) Filed: Oct. 3, 2003

(65) Prior Publication Data

US 2004/0130457 A1 Jul. 8, 2004

(30) Foreign Application Priority Data

Oct. 8, 2002 (JP) ............................. 2002-294522

(51) Int. Cl.
*G06F 7/04* (2006.01)
*H01H 47/00* (2006.01)

(52) U.S. Cl. .................... 340/5.61; 340/5.72; 307/10.5

(58) Field of Classification Search ............... 340/5.61, 340/5.72; 307/10.5
See application file for complete search history.

(56) References Cited

U.S. PATENT DOCUMENTS 6,323,566 B1 * 11/2001 Meier ........................ 307/10.2
6,538,560 B1 * 3/2003 Stobbe et al. ............... 340/5.72
6,714,119 B1 * 3/2004 Mindl et al. ................ 340/5.72

FOREIGN PATENT DOCUMENTS

JP 10-176448 6/1998
JP 2000-104429 4/2000

* cited by examiner

*Primary Examiner*—Wendy R. Garber
*Assistant Examiner*—Clara Yang
(74) *Attorney, Agent, or Firm*—Arent Fox PLLC

(57) ABSTRACT

A vehicular remote control system includes, on a portable device side, a portable device side first receiver, a portable device side transmitter, and a portable device side second receiver and, on a vehicle side, a vehicle side first transmitter, a vehicle side second transmitter, and a vehicle side receiver. Transmitting and receiving a request signal requesting an identification signal, the identification signal, an interrogation signal, and a response signal between the portable device and the vehicle allows a door lock actuator to be operated if the portable device is legitimate. When the vehicle side second transmitter or the portable device side second receiver breaks down, transmission and reception of a second request signal and the interrogation signal is carried out using the vehicle side first transmitter and the portable device side first receiver, thereby making the door lock actuator operate unhindered without the need for providing special alternative means.

3 Claims, 3 Drawing Sheets

VEHICULAR REMOTE CONTROL SYSTEM

BACKGROUND OF THE INVENTION

1. Field of the Invention

The present invention relates to a vehicular remote control system that controls the operation of a device on a vehicle by carrying out communication between a portable device and the vehicle using two types of radio waves having different frequencies.

2. Description of the Related Art

A vehicular remote control locking/unlocking system is known from Japanese Patent Application Laid-open No. 10-176448, which discloses a system in which an LF signal at a few hundred kHz is used as an ID signal request-to-send signal, which is transmitted from a vehicle to a portable device. Furthermore, the known system uses an RF signal at a few hundred MHz as an ID signal, which is transmitted from the portable device to the vehicle in response to the ID signal request-to-send signal.

Another vehicular remote control system is known from Japanese Patent Application Laid-open No. 2000-104429, which discloses a system having an ID signal request-to-send signal that is transmitted from a vehicle to a portable device. In the disclosed system, when an ID signal transmitted from the portable device to the vehicle in response to the ID signal request-to-send signal is authenticated, an interrogation signal is transmitted from the vehicle to the portable device. Accordingly, when a response signal transmitted from the portable device to the vehicle in response to the interrogation signal is authenticated, operation of a device on the vehicle is permitted.

The system disclosed in Japanese Patent Application Laid-open No. 2000-104429 has the problem wherein if a transmitter which transmits the interrogation signal or a receiver which receives the interrogation signal breaks down, transmission and reception of the interrogation signal become impossible and the entire vehicular remote control system is rendered inoperable.

SUMMARY OF THE INVENTION

The present invention addresses the above-mentioned problem by maintaining operation of a vehicular remote control system when it breaks down.

The present invention provides a vehicular remote control system having a portable device side first receiver which carries out reception at a first frequency, a portable device side transmitter which carries out transmission at a second frequency, and a portable device side second receiver which carries out reception at the second frequency are provided on the portable device side. Furthermore, a vehicle side first transmitter which carries out transmission at the first frequency, a vehicle side second transmitter which carries out transmission at the second frequency, and a vehicle side receiver which carries out reception at the second frequency are provided on the vehicle side. The vehicle side first transmitter transmits a request signal. The portable device side transmitter transmits an identification signal when the portable device side first receiver receives the request signal. The vehicle side second transmitter transmits an interrogation signal when the vehicle side receiver receives and authenticates the identification signal. The portable device side transmitter transmits a response signal when the portable device side second receiver receives the interrogation signal. Operation of a device on the vehicle is permitted when the vehicle side receiver receives and authenticates the response signal. When the vehicle side second transmitter or the portable device side second receiver breaks down, transmission and reception of the interrogation signal is carried out using the vehicle side first transmitter and the portable device side first receiver.

In accordance with this arrangement, when the vehicle side second transmitter or the portable device side second receiver breaks down, transmission and reception of the interrogation signal is carried out using the existing vehicle side first transmitter and the existing portable device side first receiver. Therefore, even in the case where the vehicle side second transmitter or the portable device side second receiver breaks down, the device on the vehicle remains operable without the need for providing special alternative means, thereby enhancing the reliability of the vehicular remote control system.

Furthermore, the present invention also provides a vehicular remote control system wherein in the case where the vehicle side receiver does not receive a response signal and a predetermined period of time has elapsed after the vehicle side second transmitter transmitted the interrogation signal, it is determined that the vehicle side second transmitter or the portable device side second receiver has broken down.

In accordance with this arrangement, it is determined that the vehicle side second transmitter or the portable device side second receiver has broken down when a response signal is not received by the vehicle side receiver until a predetermined period of time has elapsed since the vehicle side second transmitter transmitted the interrogation signal. Therefore, a malfunction of the vehicle side second transmitter or the portable device side second receiver is reliably determined.

Moreover, the present invention also provides a vehicular remote control system wherein the second frequency is higher than the first frequency.

In accordance with this arrangement, a bit rate of the second frequency is increased by making the second frequency higher than the first frequency. Therefore, transmission and reception of the interrogation signal and the response signal, which contain a large amount of information, are completed in a short period of time.

A portable transceiver 11 of an embodiment corresponds to the portable device of the present invention, an LF receiver 13 of the embodiment corresponds to the portable device side first receiver of the present invention, an RF transmitter 14 of the embodiment corresponds to the portable device side transmitter of the present invention, an RF receiver 15 of the embodiment corresponds to the portable device side second receiver of the present invention, an LF transmitter 24 of the embodiment corresponds to the vehicle side first transmitter of the present invention, an RF transmitter 25 of the embodiment corresponds to the vehicle side second transmitter of the present invention, an RF receiver 26 of the embodiment corresponds to the vehicle side receiver of the present invention, a door lock actuator 27 of the embodiment corresponds to the device on the vehicle of the present invention, and an ID signal of the embodiment corresponds to the identification signal of the present invention.

The above-mentioned characteristics and advantages of the present invention will be apparent from an explanation of a preferred embodiment described in detail below by reference to the attached drawings.

DESCRIPTION OF THE PREFERRED EMBODIMENT

Figure 1:
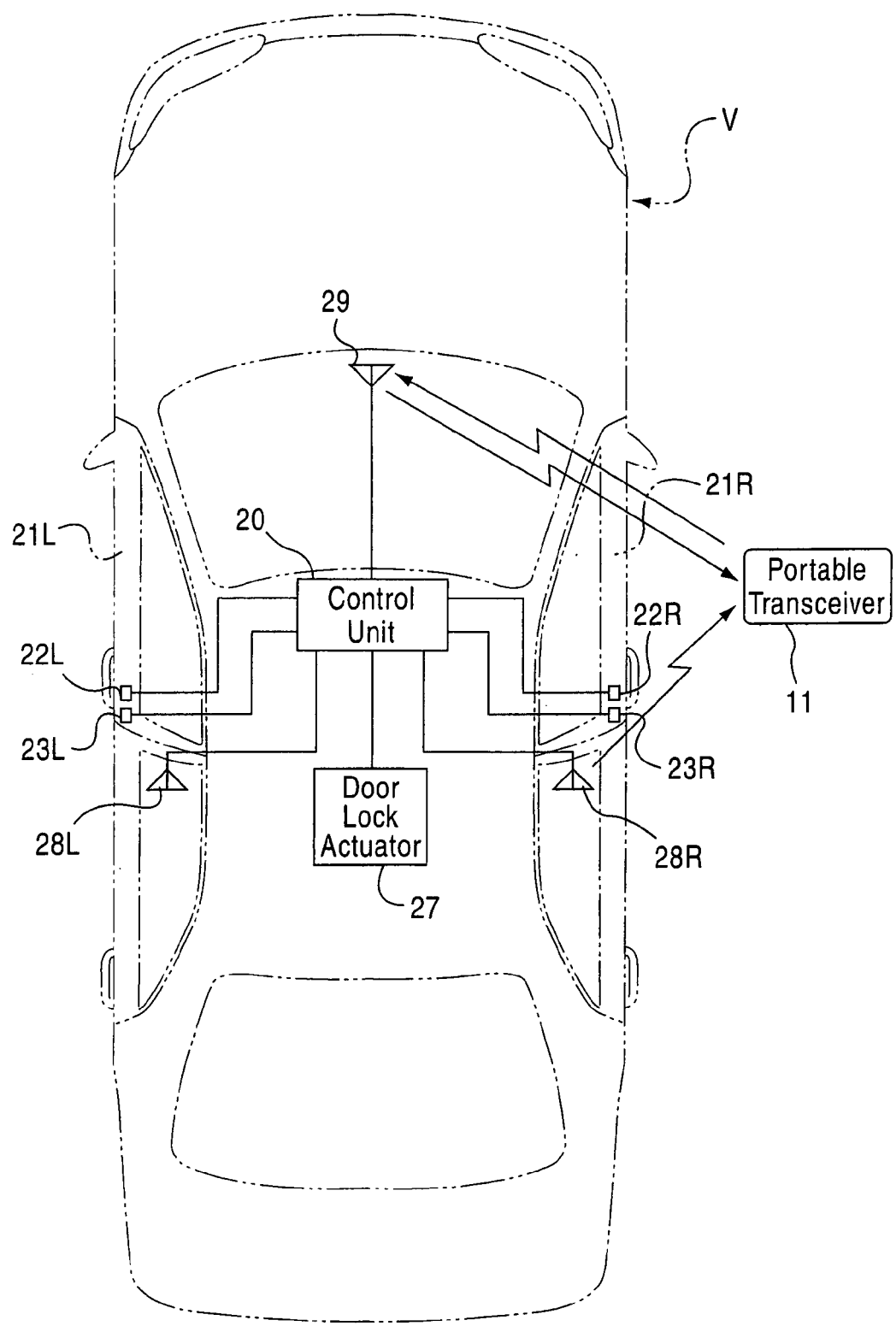
FIG. 1 is a diagram showing the overall arrangement of a vehicular remote locking/unlocking system.
Figure 2:
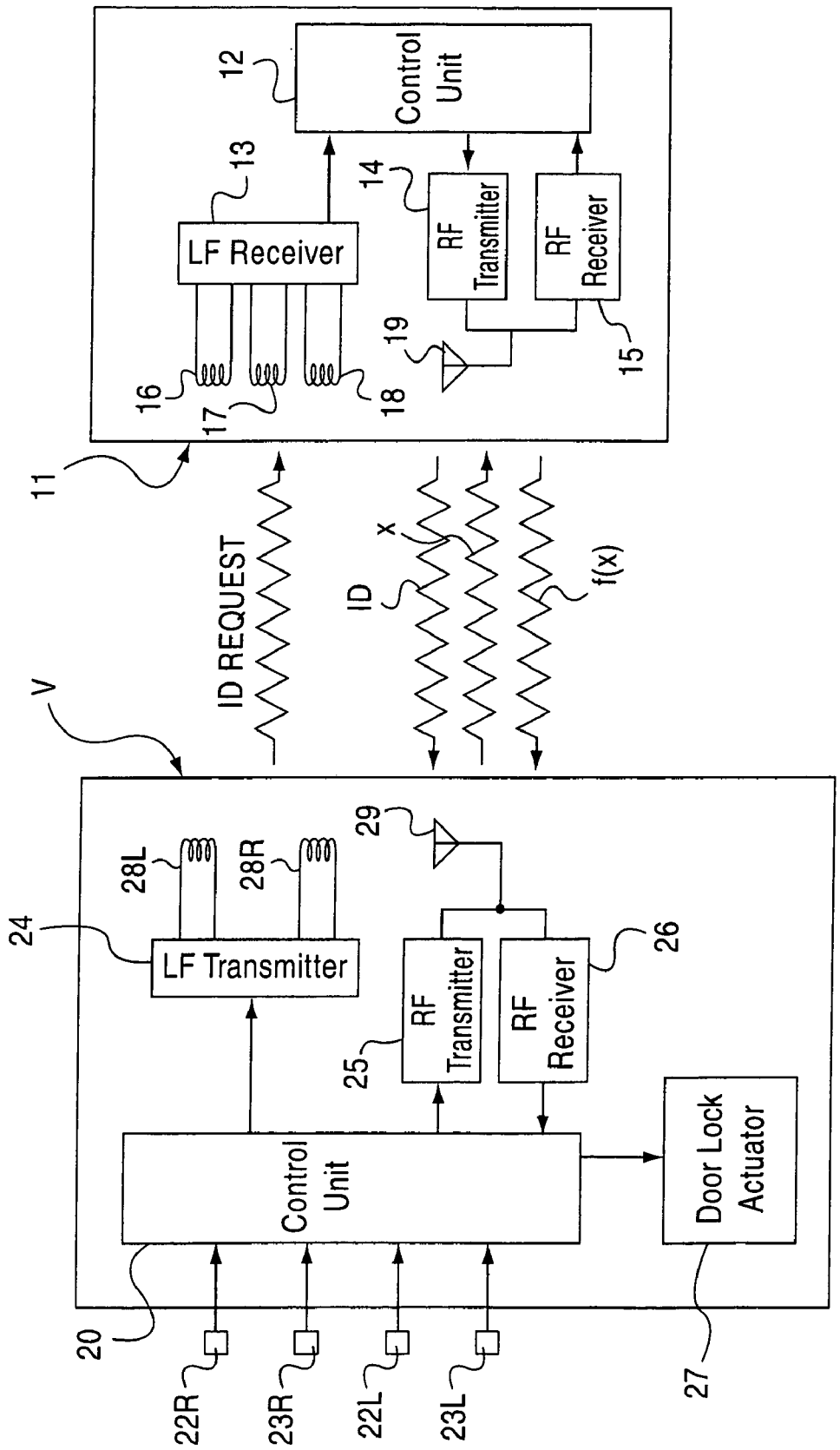
FIG. 2 is a schematic diagram of the vehicular remote locking/unlocking system.

As shown in FIG. 1 and FIG. 2, a vehicular remote locking/unlocking system which locks and unlocks the doors of a vehicle V without using a key includes a card-type portable transceiver 11 for a vehicle user to carry. Connected to a control unit 12 of the portable transceiver 11 are an LF (low frequency: for example, 125 kHz) receiver 13, an RF (radio frequency: for example, 315 MHz) transmitter 14, and an RF (radio frequency: for example, 315 MHz) receiver 15. Connected to the LF receiver 13 are three LF antennas 16, 17, and 18 having their axes orthogonal to each other. A common RF antenna 19 is connected to the RF transmitter 14 and the RF receiver 15.

Connected to a control unit 20 provided on the vehicle V side are a locking switch 22L and an unlocking switch 23L disposed on a left door 21L, a locking switch 22R and an unlocking switch 23R disposed on a right door 21R, an LF transmitter 24, an RF transmitter 25, an RF receiver 26, and a door lock actuator 27. Left and right LF antennas 28L and 28R are connected to the LF transmitter 24, and a common RF antenna 29 is connected to the RF transmitter 25 and the RF receiver 26.

Figure 3:
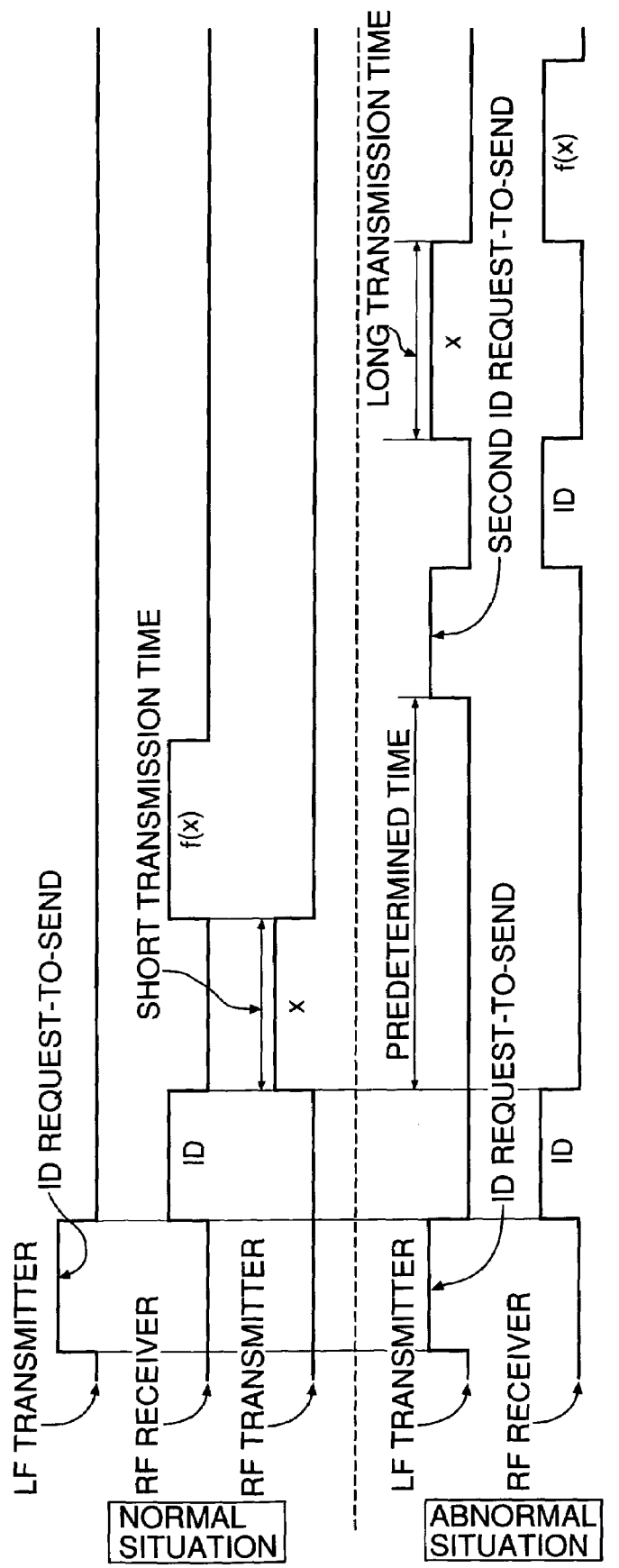
FIG. 3 is a time chart explaining the operation of the vehicular remote locking/unlocking system.

The operation of the LF transmitter 24, the RF transmitter 25, and the RF receiver 26 on the vehicle V side will now be explained by reference to the time chart of FIG. 3.

The operation when the situation is normal will be explained first. When a vehicle user equipped with the portable transceiver 11 presses the unlocking switch 23L of the left door 21L or the unlocking switch 23R of the right door 21R, an ID signal request-to-send signal is transmitted from the vehicle V side LF antenna 28L or 28R. The portable transceiver 11 receives the ID signal request-to-send signal via the LF antennas 16 to 18 and then transmits from the RF antenna 19 an ID signal stored in the control unit 12. The control unit 20 receives the ID signal via the vehicle V side RF antenna 29 and checks whether the ID signal is a legitimate ID signal pre-stored in the vehicle V side control unit 20. If the ID signal is a legitimate ID signal, the control unit 20 transmits a random number signal x as an interrogation signal, together with the ID signal, via the RF antenna 29.

The portable transceiver 11 receives the random number signal X and the ID signal via the RF antenna 19 and transmits, together with the ID signal, a function signal f(x) from the RF antenna 19 as a response signal calculated using the random number signal x in accordance with a program stored in the control unit 12. The control unit 20 receives the function signal f(x) and the ID signal via the RF antenna 29 on the vehicle V side and compares the thus-received function signal f(x) with a function signal f(x) calculated therein from the random number signal x. If the two function signals f(x) match, the control unit 20 instructs the door lock actuator 27 to operate and unlock the doors 21L and 21R.

In a similar manner, when a vehicle user equipped with the portable transceiver 11 presses the locking switch 22L of the left door 21L or the locking switch 22R of the right door 21R, the control unit 20 instructs the lock actuator 27 to operate and lock the doors 21L and 21R.

The operation when the situation is abnormal will now be explained. When a vehicle user equipped with the portable transceiver 11 presses the unlocking switch 23L of the left door 21L or the unlocking switch 23R of the right door 21R, an ID signal request-to-send signal is transmitted from the vehicle V side LF antennas 28L and 28R. The portable transceiver 11 receives the ID signal request-to-send signal via the LF antennas 16 to 18 and then transmits from the RF antenna 19 an ID signal stored in the control unit 12. The control unit 20 receives the ID signal via the RF antenna 29 on the vehicle V side and checks whether the ID signal is a legitimate ID signal.

If the thus-received ID signal is a legitimate signal, a random number signal x should be transmitted from the RF antenna 29 on the vehicle V side, and a function signal f(x) from the portable transceiver 11 should be received by the RF antenna 29 on the vehicle V side. However, if the RF antenna 29 on the vehicle V side does not receive a function signal (x) and a predetermined period of time has elapsed since the vehicle V side RF antenna 29 transmitted the random number signal x, it can be determined that the RF receiver 15 on the portable transceiver 11 side has broken down. Furthermore, if the RF transmitter 25 on the vehicle V side breaks down, the RF antenna 29 on the vehicle V side cannot receive any function signal f(x) even if the predetermined period of time has elapsed since the RF antenna 29 on the vehicle V side should have transmitted the random number signal x. Also in this case, it can be determined that an abnormality has occurred.

In brief, if the RF receiver 26 on the vehicle V side does not receive a function signal f(x) until a predetermined period of time has elapsed since the RF transmitter 25 on the vehicle V side should have transmitted the random number signal x, it can be determined that the RF transmitter 25 on the vehicle V side or the RF receiver 15 on the portable transceiver 11 side has broken down.

When it is thus determined that the RF transmitter 25 on the vehicle V side or the RF receiver 15 on the portable transceiver 11 side has broken down, the LF transmitter 24 on the vehicle V side is operated to transmit a second ID signal request-to-send signal from the LF antennas 28L and 28R, thereby requesting the portable transceiver 11 to transmit an ID signal and setting the portable transceiver 11 in a mode in which it receives a random number signal x via the LF antennas 16 to 18 thereof. The portable transceiver 11, which has received the second ID signal request-to-send signal via the LF antennas 16 to 18, transmits the ID signal stored in the control unit 12 from the RF antenna 19. The control unit 20 receives the ID signal via the RF antenna 29 on the vehicle V side and checks whether the ID signal is a legitimate ID signal.

If the received ID signal is a legitimate ID signal, the LF transmitter 24 is operated instead of the RF transmitter 25 on the vehicle V side, so as to transmit a random number signal x from the LF antennas 28L and 28R. When the random number signal x is received via the LF antennas 16 to 18 and the LF receiver 13 on the portable transceiver 11 side, a function signal f(x) is calculated from the random number signal x in accordance with a program stored in the control unit 12 and transmitted from the RF antenna 19 on the portable transceiver 11. The control unit 20 receives the function signal f(x) via the RF antenna 29 on the vehicle V side and compares the received function signal f(x) with a function signal f(x) calculated therein from the random number signal x. If the two function signals match, the door lock actuator 27 is operated to unlock the doors 21L and 21R.

As described above, even when the RF transmitter 25 on the vehicle V side or the RF receiver 15 on the portable transceiver 11 side breaks down, the LF transmitter 24 on the vehicle V side and the LF receiver 13 on the portable transceiver 11 side are used as substitutes to maintain operation of the vehicular remote locking/unlocking system without the need for special and/or alternative means. However, since an LF signal, which has a low bit rate, is used for transmitting the ID signal and the random number signal X, the transmission time is longer than a case in which the standard RF signal, which has a high bit rate, is used.

The same operation as above will be effected in the case where it is determined that there is an abnormality when the vehicle user presses the locking switch 22L of the left door 21L or the locking switch 22R of the right door 21R.

Although an embodiment of the present invention is explained in detail above, the present invention can be modified in a variety of ways without departing from the spirit and scope of the present invention.

For example, a vehicular remote locking/unlocking system is illustrated in the embodiment, but the present invention can also be applied to any vehicular remote control system, such as an immobilizer for another purpose of use.

What is claimed is:

1. A vehicular remote control system comprising:
   a portable device side first receiver which carries out reception at a first frequency, a portable device side transmitter which carries out transmission at a second frequency, and a portable device side second receiver which carries out reception at the second frequency, are each provided on a portable device side; and
   a vehicle side first transmitter which carries out transmission at the first frequency, a vehicle side second transmitter which carries out transmission at the second frequency, and a vehicle side receiver which carries out reception at the second frequency, are each provided on a vehicle side,
   the vehicle side first transmitter transmitting a request signal; the portable device side transmitter transmitting an identification signal when the portable device side first receiver receives the request signal; the vehicle side second transmitter transmitting an interrogation signal when the vehicle side receiver receives and authenticates the identification signal; the portable device side transmitter transmits a response signal when the portable device side second receiver receives the interrogation signal; operation of a device on the vehicle being permitted when the vehicle side receiver receives and authenticates the response signal,
   wherein, when the vehicle side second transmitter or the portable device side second receiver breaks down, transmission and reception of the interrogation signal is carried out using the vehicle side first transmitter and the portable device side first receiver.

2. The vehicular remote control system according to claim 1, wherein when the vehicle side receiver does not receive the response signal until a predetermined period of time has elapsed since the vehicle side second transmitter transmitted the interrogation signal, a determination is made that the vehicle side second transmitter or the portable device side second receiver has broken down.

3. The vehicular remote control system according to claim 1, wherein the second frequency is higher than the first frequency.

* * * * *